(12) United States Patent
     Kim (10) Patent No.: US 10,720,684 B2
(45) Date of Patent: Jul. 21, 2020

(54) THERMAL MANAGEMENT SYSTEM FOR BATTERY

(71) Applicants: Hyundai Motor Company, Seoul (KR); Kia Motors Corporation, Seoul (KR)

(72) Inventor: Jae Yeon Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 146 days.

(21) Appl. No.: 15/946,089

(22) Filed: Apr. 5, 2018

(65) Prior Publication Data

US 2019/0165438 A1    May 30, 2019

(30) Foreign Application Priority Data

Nov. 30, 2017  (KR) ........................ 10-2017-0163325

(51) Int. Cl.
```
H01M 10/6569    (2014.01)
H01M 10/625     (2014.01)
H01M 10/615     (2014.01)
H01M 10/6556    (2014.01)
H01M 10/613     (2014.01)
H01M 10/63      (2014.01)
H01M 10/66      (2014.01)
```
(52) U.S. Cl.
CPC ..... *H01M 10/6569* (2015.04); *H01M 10/613* (2015.04); *H01M 10/615* (2015.04); *H01M 10/625* (2015.04); *H01M 10/63* (2015.04); *H01M 10/6556* (2015.04); *H01M 10/66* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 6,170,270 B1 | 1/2001 | Arshansky et al. |
| 8,215,432 B2 | 7/2012 | Nemesh et al. |
| 8,899,062 B2 | 12/2014 | Kadle et al. |
| 9,109,840 B2 | 8/2015 | Kadle et al. |
| 9,239,193 B2 | 1/2016 | Kadle et al. |
| 2005/0022983 A1 | 2/2005 | Kadle et al. |
| 2013/0283838 A1 | 10/2013 | Kadle et al. |

FOREIGN PATENT DOCUMENTS

| | | |
|---|---|---|
| CN | 103380339 A | 10/2013 |
| JP | 5336033 B2 | 11/2013 |

*Primary Examiner* — Daniel S Gatewood
(74) *Attorney, Agent, or Firm* — Morgan, Lewis & Bockius LLP (57) ABSTRACT

A thermal management system for batteries may include a battery where a coolant circulates through a battery coolant line; a cooling apparatus that circulating a coolant cooled in a radiator through a radiator coolant line; and a centralized energy (CE) module which is connected to the battery through the battery coolant line, connected to the cooling apparatus through the radiator coolant line, performs thermal exchange between thermal energy generated from condensation and evaporation of a refrigerant circulating in the CE module and the coolant, and selectively supplies a high-temperature coolant or a low-temperature coolant that has been thermally exchanged to the battery.

16 Claims, 6 Drawing Sheets

THERMAL MANAGEMENT SYSTEM FOR BATTERY

CROSS-REFERENCE TO RELATED APPLICATION

The present application claims priority to Korean Patent Application No. 10-2017-0163325 filed on Nov. 30, 2017, the entire contents of which is incorporated herein for all purposes by this reference.

BACKGROUND OF THE INVENTION

Field of the Invention

The present invention relates to a thermal management system for a battery, and more particularly, the present invention relates to a thermal management system for a battery to effectively heat or cool the battery by use of thermal energy generated from phase change of a refrigerant that circulates inside the system.

Description of Related Art

Recently, electric vehicles have been attracting attention as vehicles for the future, as environmental problems and energy resources are important issues. Since an electric vehicle utilizes a battery formed of a pack of a plurality of rechargeable batteries as a primary power source, no exhaust gas is discharged and it generates very little noise.

Such a battery can be applied to an electric vehicle depending on its size, but can also be applied to a battery container for various electronic devices or an energy storage system (ESS) for charging a vehicle or supplying power to a home.

Here, when the battery is applied to the battery container, the battery is configured to be charged by power using inexpensive late night power and to use the charged power.

As described, in a case of a battery which is used as a primary power source of a vehicle or which is applied to a battery container, charging or discharging very frequently occurs and the magnitude of charging or discharging power is also very large so that the amount of heat generated by the battery is also great.

Furthermore, since battery performance is influenced by a temperature of the battery, it is a very important issue to maintain the temperature of the battery and the temperature distribution to be uniform.

Conventionally, a battery air conditioning system is applied to control a temperature of a battery, but capacity of the air conditioning system needs to be increased depending on the size of the battery, causing a spatial constraint. Furthermore, when capacity of the battery air conditioning system is increased, power required to run the air conditioning system is also increased.

Accordingly, to maximize the energy efficiency while extending the life of the battery, technology for controlling the temperature of the battery needs to be developed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for batteries that can effectively heat or cool a battery by use of thermal energy generated from phase change of a refrigerant that circulates in the thermal management system.

A thermal management system for batteries according to exemplary embodiments of the present invention may include: a battery where a coolant circulates through a battery coolant line; a cooling apparatus that circulating a coolant cooled in a radiator through a radiator coolant line; and a centralized energy (CE) module which is connected to the battery through the battery coolant line, connected to the cooling apparatus through the radiator coolant line, performs thermal exchange between thermal energy generated from condensation and evaporation of a refrigerant circulating in the CE module and the coolant, and selectively supplies a high-temperature coolant or a low-temperature coolant that has been thermally exchanged to the battery.

According to various exemplary embodiments of the present invention, the CE module may include: a compressor that compresses a refrigerant; a valve connected to the compressor through a first refrigerant line and a fifth refrigerant line; a first heat exchanger which is connected to the radiator coolant line, connected to the valve through a second refrigerant line, and condenses or evaporates the refrigerant through thermal exchange with the coolant; a second heat exchanger which is connected to the battery coolant line, connected to the first heat exchanger through a third refrigerant line, connected to the valve through a fourth refrigerant line, and condenses or evaporates the refrigerant through thermal exchange with the coolant; and an expansion valve which is provided in the third refrigerant line between the first heat exchanger and the second heat exchanger, and expanding a refrigerant that passes through the third refrigerant line.

When the battery needs to be cooled, the valve connects the first refrigerant line and the second refrigerant line to supply a refrigerant discharged from the compressor to the first heat exchanger, and connects the fourth refrigerant line and the fifth refrigerant line to supply the refrigerant to the compressor from the second heat exchanger into which the refrigerant expanded by the expansion valve flows.

The first heat exchanger receives a high-temperature high-pressure refrigerant discharged from the compressor through the first refrigerant line and the second refrigerant line, and is configured as a condenser that condenses a coolant supplied from the cooling apparatus and the refrigerant through thermal exchange.

The second heat exchanger receives a low-temperature low-pressure refrigerant expanded by the expansion valve, and is configured as an evaporator that evaporates a coolant supplied through the battery coolant line and the refrigerant through thermal exchange.

When the battery needs to be heated, the valve connects the first refrigerant line and the fourth refrigerant line to supply the refrigerant discharged from the compressor to the second heat exchanger, and connects the second refrigerant line and the fifth refrigerant line to supply the refrigerant to the compressor from the first heat exchanger that receives the refrigerant expanded by the expansion valve.

The first heat exchanger receives a low-temperature low-pressure refrigerant expanded by the expansion valve through the third refrigerant line, and is configured as an evaporator that evaporates the coolant supplied from the cooling apparatus through thermal exchange with the refrigerant.

The second heat exchanger receives a high-temperature and high-pressure refrigerant discharged from the compressor through the first refrigerant line and the fourth refrigerant line, and is configured as a condenser that condenses the refrigerant through thermal exchange with the coolant supplied through the battery coolant line.

The valve is provided as a four-way valve which is respectively connected to the first refrigerant line, the second refrigerant line, the fourth refrigerant line, and the fifth refrigerant line, and selectively connects two of the first, second, fourth, and fifth refrigerant lines.

A first water pump that supplies a coolant to the battery may be provided in the battery coolant line.

The cooling apparatus may further include a second water pump which is provided in the radiator coolant line and circulates a coolant cooled in the radiator.

A refrigerant circulating in the CE module may be a R152-a, R744, or R290 refrigerant.

Furthermore, in a thermal management system for batteries according to various exemplary embodiments of the present invention, the CE module may include: a compressor that compresses a refrigerant; a condenser which is connected to the compressor through a refrigerant line, connected to the cooling apparatus through the radiator coolant line, and condenses the refrigerant supplied from the compressor by thermal exchange with a coolant supplied through the radiator coolant line; an expansion valve which is connected to the condenser through the refrigerant line and expands the refrigerant; and an evaporator which is connected to the expansion valve through the refrigerant line, connected to the battery coolant line, and evaporates the refrigerant expanded by the expansion valve by thermal exchange with a coolant supplied through the battery coolant line.

An electric heater may be provided in the battery coolant line between the battery and the evaporator.

When the battery needs to be heated, operations of the cooling apparatus and the CE module may be stopped, the electric heater may start to operate to increase a temperature of a coolant circulating in the battery coolant line, and a temperature-increased coolant is supplied to the battery.

According to the exemplary embodiments of the present invention, the thermal management system for batteries can effectively manage batteries while simplifying the entire system by performing selective thermal exchange between thermal energy generated from a refrigerant circulating in the system during condensation and evaporation of the refrigerant with a coolant and effectively heating or cooling the battery by use of the coolant having a low temperature or a high temperature by the thermal exchange.

Furthermore, operation efficiency may be improved by use of a relatively inexpensive and high-performing R152-a, R744, or R290 refrigerant.

Furthermore, a CE module having a modular structure is applied such that manufacturing cost may be saved, weight may be reduced, and special utilization may be improved.

Furthermore, since the temperature of the battery may be managed by water cooling and the CE module is used, the system may be applied without regard to capacity of a middle-sized or large-sized battery, and when the system is applied to a vehicle, it is possible to separate the system from an interior heating/cooling apparatus, increasing the degree of freedom of capacity.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

An exemplary embodiment of the present invention will hereinafter be described more specifically with reference to the accompanying drawings.

Although embodiments have been described with reference to a number of illustrative embodiments thereof, it should be understood that numerous other modifications and embodiments may be devised by those skilled in the art that will fall within the spirit and scope of the principles of the present invention.

The drawings and description are to be regarded as illustrative in nature and not restrictive, and like reference numerals designate like elements throughout the specification.

Since sizes and thicknesses of the respective components are arbitrarily shown in the accompanying drawings for convenience of explanation, the present invention is not limited to contents shown in the accompanying drawings. Furthermore, thicknesses are exaggerated in order to obviously represent several portions and regions.

Furthermore, unless explicitly described to the contrary, the word "comprise" and variations such as "comprises" or "comprising" will be understood to imply the inclusion of stated elements but not the exclusion of any other elements.

Furthermore, the terms "~ unit", "~ portion", "~ means", and the like, described in the specification mean devices of a comprehensive configuration for performing at least one function and operation.

Figure 1:
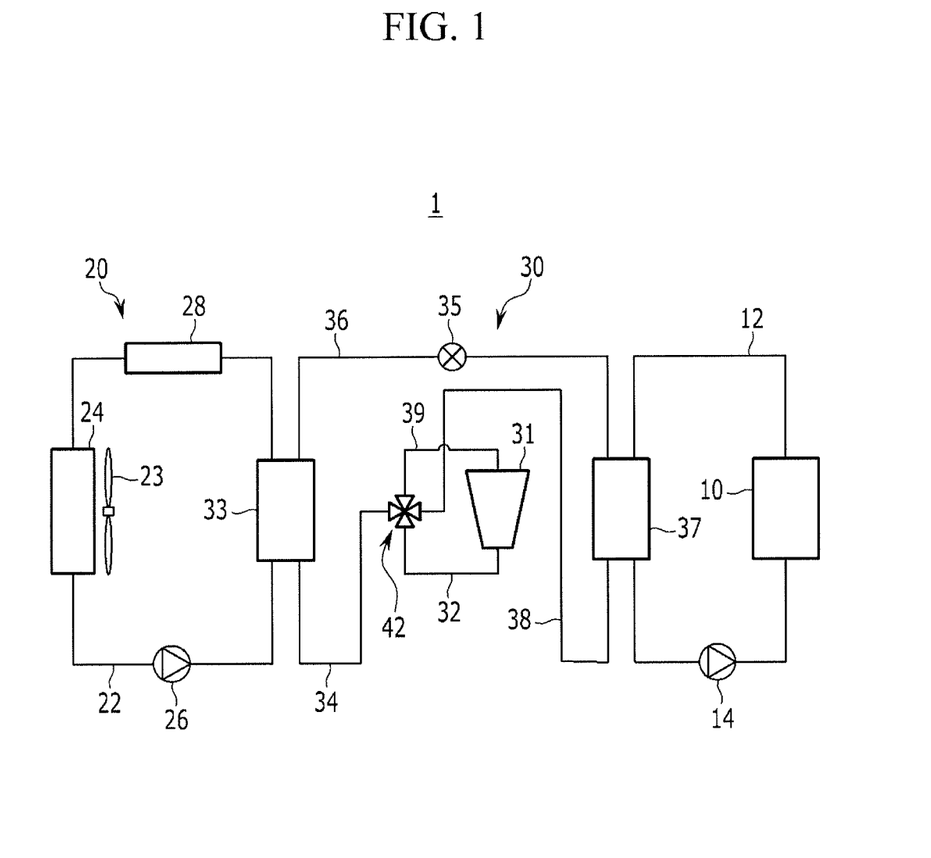
FIG. 1 is a block diagram of a thermal management system for a battery according to various exemplary embodiments of the present invention.

FIG. 1 is a block diagram of a thermal management system for batteries according to various exemplary embodiments of the present invention.

A thermal management system 1 for batteries according to the various exemplary embodiments of the present invention is adopted to effectively control a temperature of a battery 10 in a manner of a water cooling type by selectively using thermal energy generated from phase change of a coolant that circulates inside the battery.

Thus, as shown in FIG. 1 the thermal management system 1 according to the various exemplary embodiments of the present invention includes the battery 10, a cooling apparatus 20, and a centralized energy (CE) module 30.

A coolant circulates inside the battery 10 through a battery coolant line 12. That is, a temperature of the battery 10 is controlled in a water cooling manner.

Here, a first water pump 14 that supplies the coolant to the battery 10 is provided in the battery coolant line 12.

In the exemplary embodiment of the present invention, the cooling apparatus 20 circulates a coolant cooled in a radiator 24 through a radiator coolant line 22. A cooling fan 23 may be provided at a rear side of the radiator 24.

Such a cooling apparatus 20 is provided in the radiator coolant line 22, and may further include a second water pump 26 that circulates the coolant cooled by the radiator 24. Furthermore, in a case of a vehicle, a heating body 28 that includes an engine, a motor, an electrical part, and the like may be provided on the radiator coolant line 22.

Here, the first water pump 14 and the second water pump 26 may be mechanical or electrical water pumps.

Furthermore, the CE module 30 is connected to the battery 10 through the battery coolant line 12, and is connected to the cooling apparatus 20 through the radiator coolant line 22.

Such a CE module 30 exchanges thermal energy generated from condensation and evaporation of a refrigerant with the coolant, and selectively supplies a coolant of which a temperature is low or high from the thermal exchange to the battery 10.

Here, the refrigerant may be a relatively inexpensive and high-performing refrigerant including R152-a, R744, or R290.

As shown in FIG. 1, the CE module 30 according to the various exemplary embodiments of the present invention may include a compressor 31, a valve 42, first and second heat exchangers 33 and 37, and an expansion valve 35.

First, the compressor 31 compresses a coolant. Here, the compressor 31 compresses a coolant supplied from the first heat exchanger 33 or the second heat exchanger 37 according to operation of the valve 42.

In the exemplary embodiment of the present invention, the valve 42 is connected to the compressor 31 through a first refrigerant line 32 and a fifth refrigerant line 39.

Such a valve 42 may be connected to a second refrigerant line 34 and a fourth refrigerant line 38, which will be described later.

That is, the valve 42 may be a four-way valve which is connected to the first, second, fourth, and fifth refrigerant lines 32, 34, 38, and 39 and selectively connects two of each of the four refrigerant lines 32, 34, 38, and 39.

For example, when the first refrigerant line 32 is connected to the second refrigerant line 34 through the valve 42, the fourth refrigerant line 38 is connected to the fifth refrigerant line 39 through the valve 42.

Furthermore, when the first refrigerant line 32 is connected to the fifth refrigerant line 39 through the valve 42, the second refrigerant line 34 is connected to the fourth refrigerant line 38 through the valve 42.

In the exemplary embodiment of the present invention, the first heat exchanger 33 is connected to the radiator coolant line 22, and a coolant that circulates through the cooling apparatus 20 may flow into the first heat exchanger 33.

Such a first heat exchanger 33 is connected to the second refrigerant line 34 through the valve 42 such that the refrigerant may be condensed or evaporated through thermal exchange with the coolant.

The second heat exchanger 37 is connected to the battery coolant line 12, and the coolant that circulates through the battery 10 may flow into the second heat exchanger 37.

Such a second heat exchanger 37 is connected to a third refrigerant line 36 through the first heat exchanger 33 and connected to the fourth refrigerant line 38 through the valve 42, and the refrigerant is condensed or evaporated through thermal exchange with the coolant.

Furthermore, the expansion valve 35 is provided in the third refrigerant line 36 between the first heat exchanger 33 and the second heat exchanger 37. Such an expansion valve 35 expands the refrigerant that passes through the third refrigerant line 36.

The expansion valve 35 may be provided as a mechanical or electronic expansion valve.

The CE module 30 may have a modular structure in which all constituent elements are disposed inside a housing, and they are connected by connection pipes of which lengths are relatively short and which form the first, second, third, fourth, and fifth refrigerant lines 32, 34, 36, 38, and 39.

Hereinafter, operation and action of the above-described thermal management system 1 for the battery according to the various exemplary embodiments of the present invention will be described more specifically.

Figure 2:
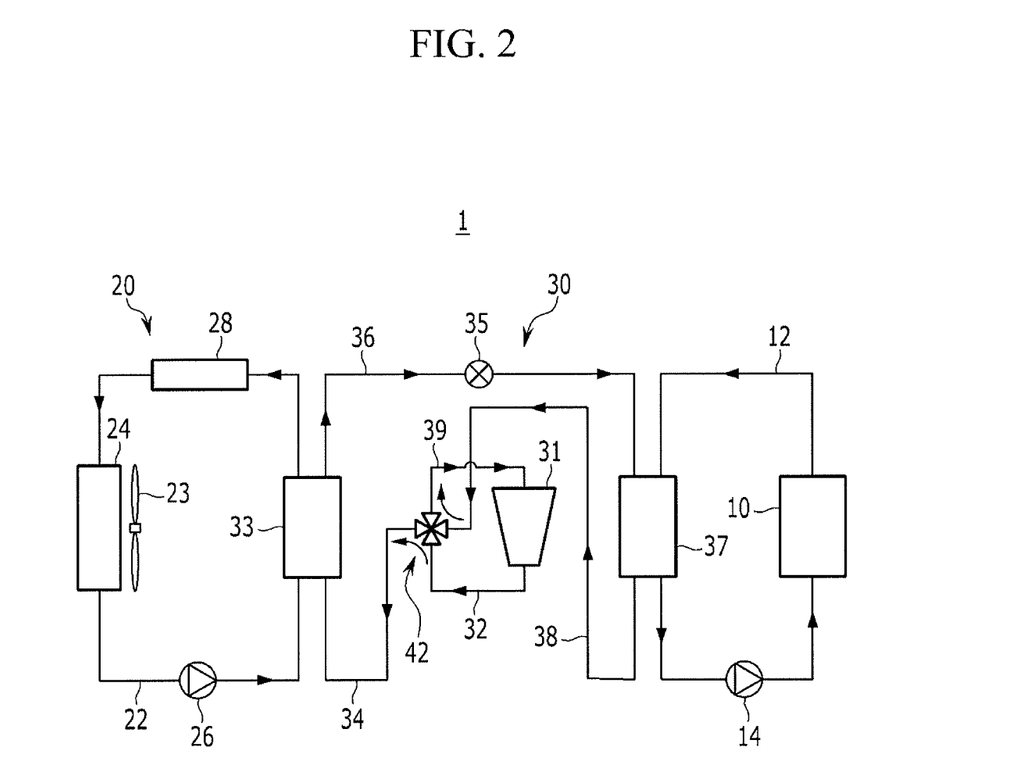
FIG. 2 is a diagram of an operation state of cooling the battery in the thermal management system for the battery according to the various exemplary embodiments of the present invention.
Figure 3:
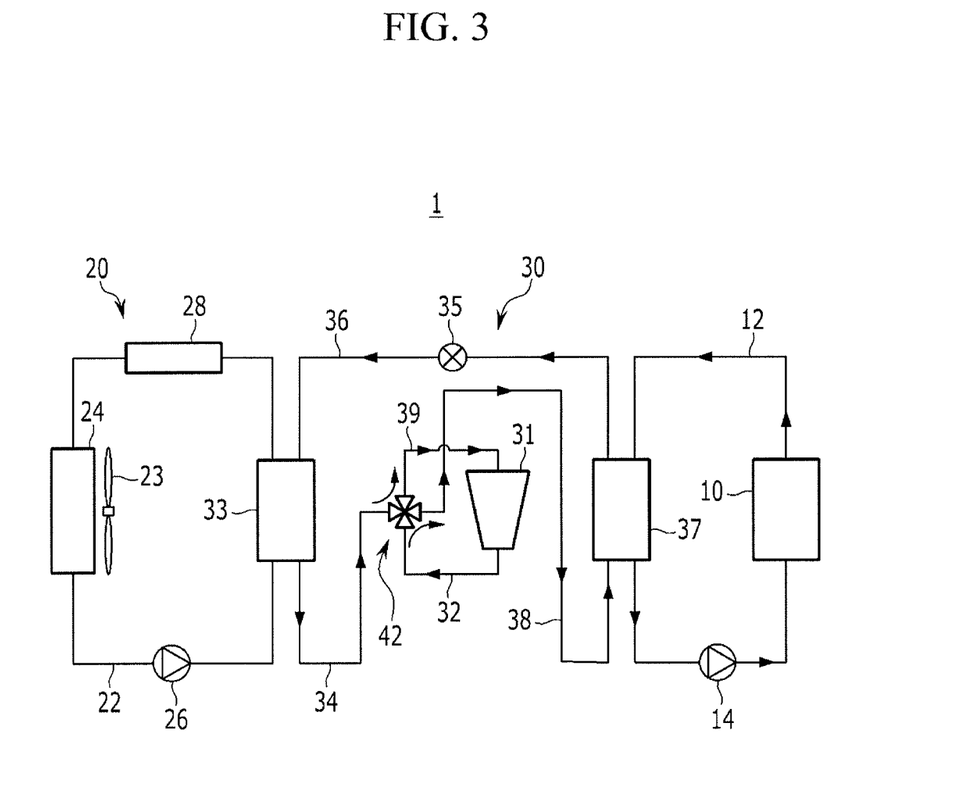
FIG. 3 is a diagram of an operation state of heating the battery in the thermal management system for the battery according to the various exemplary embodiments of the present invention.

FIG. 2 is a diagram of an operation state of cooling of the battery in the thermal management system according to the various exemplary embodiments of the present invention, and FIG. 3 is a diagram of an operation state of heating of the battery in the thermal management system according to the various exemplary embodiments of the present invention.

First, operation of the thermal management system with respect to a case that the battery 10 is heated and thus needs to be cooled will be described with reference to FIG. 2.

When the battery 10 needs to be cooled, the valve 42 connects the first refrigerant line 32 and the second refrigerant line 34 to supply a high-temperature and high-pressure refrigerant exhausted from the compressor 31 to the first heat exchanger 33.

Accordingly, the high-temperature and high-pressure refrigerant exhausted from the compressor 31 flows into the first heat exchanger 33 through the first refrigerant line 32 and the second refrigerant line 34.

Here, the first heat exchanger 33 is configured as a condenser that performs condensation through thermal exchange between the coolant supplied from the cooling apparatus 20 and the refrigerant.

Simultaneously, the valve 42 connects the fourth refrigerant line 38 and the fifth refrigerant line 39 to supply the refrigerant to the compressor from the second heat exchanger 37 to which a refrigerant which is expanded by the expansion valve 35 flows.

Accordingly, a low-temperature and low-pressure refrigerant which is expanded in the expansion valve 35 flows into the second heat exchanger 37 through the third refrigerant line 36.

Here, the second heat exchanger 37 is configured as an evaporator that evaporates the refrigerant through thermal exchange between the coolant supplied through the battery coolant line 12 and the refrigerant.

That is, the second heat exchanger 37 evaporates the refrigerant supplied from the expansion valve 35 through the thermal exchange with the coolant having flowed through the battery coolant line 12, and supplies low-temperature thermal energy generated from the evaporation of the refrigerant to decrease a temperature of the coolant.

The low-temperature coolant may be sufficiently supplied to the battery 10 that needs to be cooled while circulating through the battery coolant line 12 by operation of the first water pump 14.

As described, the second heat exchanger 37 is configured as an evaporator to perform thermal exchange between the low-temperature refrigerant and the coolant, and the coolant of which a temperature is decreased is supplied to the battery 10 that needs to be cooled, effectively cooling the battery 10.

On the other hand, an operation to heat a battery 10 which is in a low-temperature state will be described with reference to FIG. 3.

When the battery 10 needs to be heated, the valve 42 connects the first refrigerant line 32 and the fourth refrigerant line 38 to supply a high-temperature high-pressure refrigerant discharged from the compressor 31 to the second heat exchanger 37.

Accordingly, the high-temperature high-pressure refrigerant discharged from the compressor 31 flows into the second heat exchanger 37 through the first refrigerant line 32 and the fourth refrigerant line 38.

Here, the second heat exchanger 37 is configured as a condenser that performs condensation through thermal exchange between the coolant supplied from the battery coolant line 12 and the refrigerant.

That is, the second heat exchanger 37 condenses the refrigerant supplied from the compressor 31 through thermal exchange with the coolant supplied in the second heat exchanger 37 through the battery coolant line 12, and supplies low-temperature thermal energy generated from the condensation of the refrigerant, increasing a temperature of the coolant.

The coolant of which the temperature is increased circulates along the battery coolant line 12 by operation of the first water pump 14, being sufficiently supplied to the battery 10 that needs to be heated.

As described, the second heat exchanger 37 is configured as a condenser to perform thermal exchange between a high-temperature refrigerant and a coolant, and effectively increase a temperature of the battery 10 that needs to be heated by supplying the temperature-increased coolant to the battery 10.

Simultaneously, the valve 42 connects the second refrigerant line 34 and the fifth refrigerant line 39 to supply the refrigerant to the compressor 31 from the first heat exchanger 33 into which a refrigerant expanded by the expansion valve 35 flows.

Accordingly, a low-temperature low-pressure coolant expanded by the expansion valve 35 flows into the first heat exchanger 33 through the third refrigerant line 36.

Here, the first heat exchanger 33 is configured as an evaporator that evaporates the coolant and the refrigerant supplied from the cooling apparatus 30 through thermal exchange.

That is, the thermal management system 1 for batteries according to the various exemplary embodiments of the present invention can effectively manage a temperature of the battery 10 since the first and second heat exchangers 33 and 37 provided in the CE module 30 selectively serve as an evaporator or a condenser depending on whether the battery 10 needs to be cooled or heated.

Accordingly, the thermal management system 1 for batteries according to the various exemplary embodiments of the present invention can effectively manage batteries while simplifying the entire system by performing selective thermal exchange between thermal energy generated from a refrigerant circulating in the system 1 during condensation and evaporation of the refrigerant with a coolant, and effectively heating or cooling the battery 10 by use of the coolant having a low temperature or a high temperature by the thermal exchange.

Furthermore, a relatively inexpensive and high-performing R152-a, R744, or R290 refrigerant is applied to the CE module 30 such that operation efficiency may be improved.

Furthermore, according to an exemplary embodiment of the present invention, the CE module 30 having a modular structure is applied such that manufacturing cost may be saved, weight may be reduced, and special utilization may be improved.

Furthermore, according to an exemplary embodiment of the present invention, since the temperature of the battery 10 may be managed by water cooling and the CE module 30 is used, the system may be applied without regard to capacity of a middle-sized or large-sized battery, and when the system is applied to a vehicle, it is possible to separate the system from an interior heating/cooling apparatus, increasing the degree of freedom of capacity.

Figure 4:
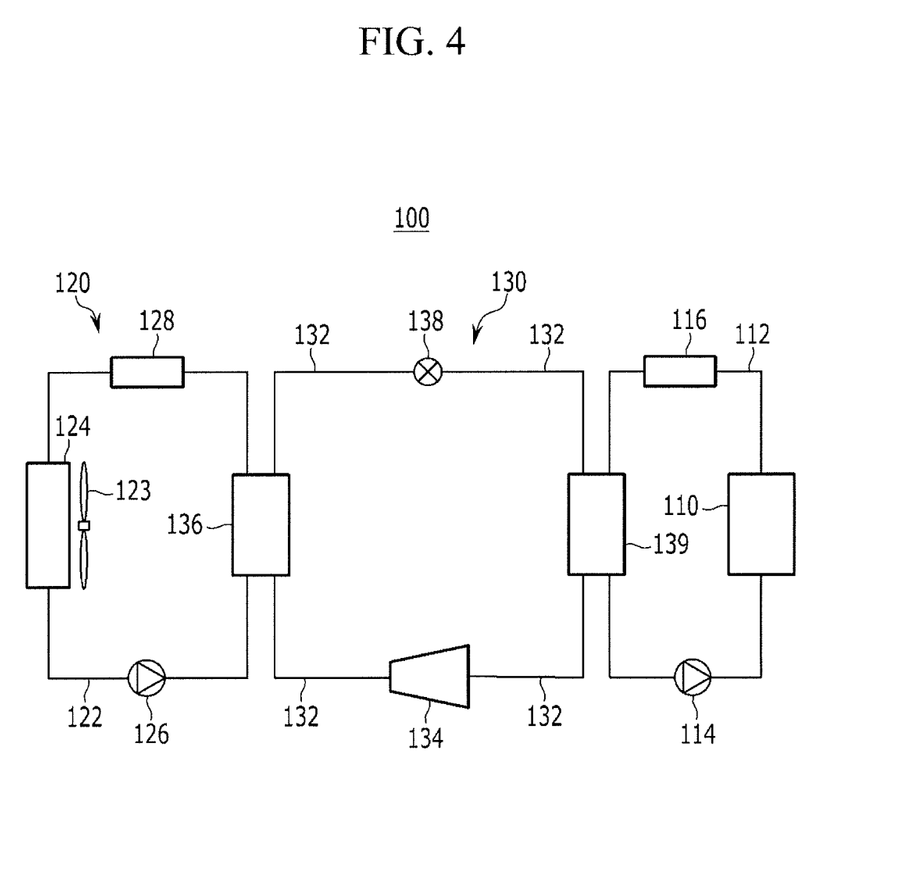
FIG. 4 is a block diagram of a thermal management system for a battery according to various exemplary embodiments of the present invention.

FIG. 4 is a block diagram of a thermal management system 100 for batteries according to various exemplary embodiments of the present invention.

A thermal management system 100 for batteries according to the various exemplary embodiments of the present invention is applied to effectively control a temperature of a battery 110 in a manner of a water cooling type by selectively using thermal energy generated when a refrigerant that circulates through the thermal management system 1 is phase-changed.

For this, as shown in FIG. 4, the thermal management system 100 for batteries according to the various exemplary embodiments of the present invention includes the battery 110, a cooling apparatus 120, and a CE module 130.

First, a coolant circulates through the battery 110 through a battery coolant line 112. That is, a temperature of the battery 110 may be controlled by water cooling.

Here, a first water pump 114 that supplies a coolant to the battery 110 is provided in the battery coolant line 112. Furthermore, an electric heater 116 may be provided in the battery coolant line 112.

In the exemplary embodiment of the present invention, the cooling apparatus 120 circulates a coolant cooled in a radiator 124 through a radiator coolant line 122. A cooling fan 123 may be provided at a rear side of the radiator 124.

Such a cooling apparatus 120 may further include a second water pump 126 that circulates the coolant cooled in the radiator 124, and is provided in the radiator coolant line 122. Furthermore, in a case of a vehicle, a heating body 128 that includes an engine, a motor, an electrical part, and the like may be provided on the radiator coolant line 122.

Here, the first water pump 114 and the second water pump 126 may be mechanical or electrical water pumps.

Furthermore, the CE module 130 is connected to the battery 110 through the battery coolant line 112, and is connected to the cooling apparatus 120 through the radiator coolant line 122.

Such a CE module 130 exchanges thermal energy generated from condensation and evaporation of a refrigerant with the coolant, and selectively supplies a coolant of which a temperature is low or high from the thermal exchange to the battery 110.

Here, the refrigerant may be a relatively inexpensive and high-performing refrigerant including R152-a, R744, or R290.

As shown in FIG. 4, the CE module 130 according to the various exemplary embodiments of the present invention includes a compressor 134 connected through a first refrigerant line 132, a condenser 136, an expansion valve 138, and an evaporator 139.

The compressor 134 receives a refrigerant discharged from the evaporator 139 through the refrigerant line 132 and then compresses the refrigerant.

The condenser 136 is connected to the compressor 134 through the refrigerant line 132. Such a condenser 136 is connected to the cooling apparatus 120 through the radiator coolant line 122.

The condenser 136 may condense the refrigerant supplied from the compressor 134 through thermal exchange with a coolant supplied through the radiator coolant line 122.

The expansion valve 138 is connected to the condenser 136 through the refrigerant line 132, and expands the refrigerant having passed through the condenser 136.

Such an expansion valve 138 may be provided as a mechanical or electronic expansion valve.

Furthermore, the evaporator 139 is connected to the expansion valve 138 through the refrigerant line 132. The evaporator 139 is connected to the battery coolant line 112, and a coolant circulating through the battery 110 may flow into the evaporator 139.

Here, the electric heater 116 may be provided in the battery coolant line 112 between the battery 110 and the evaporator 139.

Such an evaporator 139 may evaporate the refrigerant expanded by the expansion valve 138 through thermal exchange with a coolant supplied through the battery coolant line 112.

The CE module 130 may have a modular structure in which all constituent elements are disposed inside a housing, and they are connected by connection pipes of which lengths are relatively short and which form the refrigerant lines 132.

Hereinafter, operation and action of the above-described thermal management system 100 for the battery according to the various exemplary embodiments of the present invention will be described more specifically.

Figure 5:
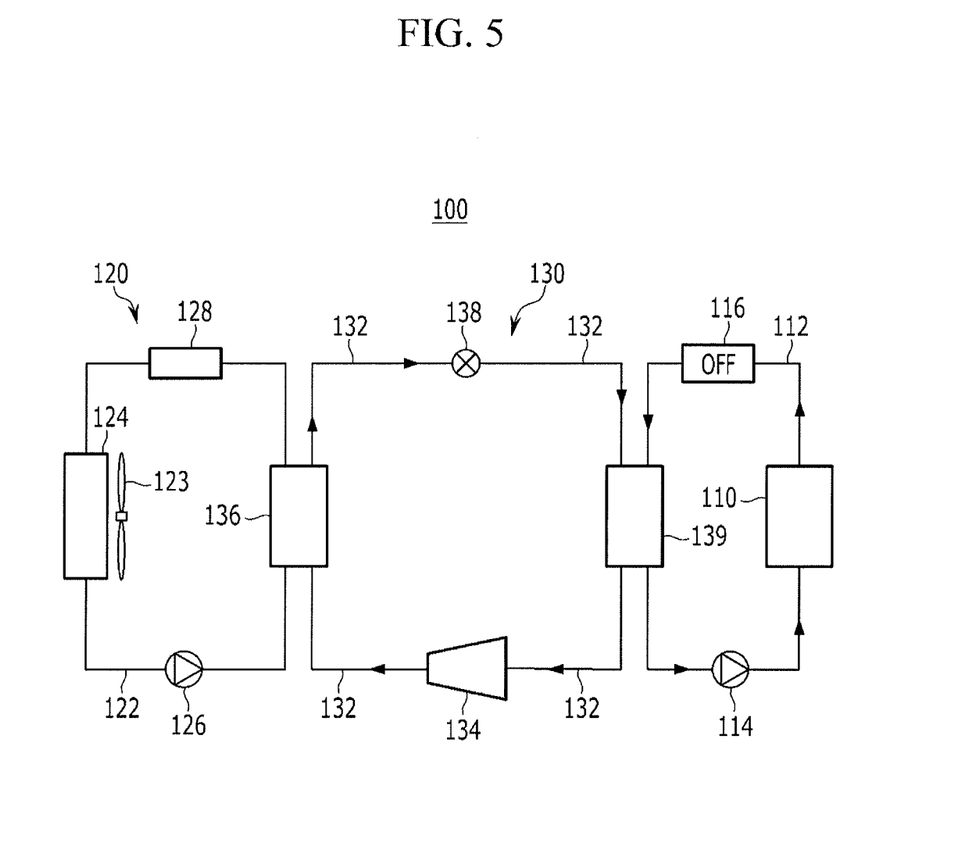
FIG. 5 is a diagram of an operation state of cooling the battery in the thermal management system according to the various exemplary embodiments of the present invention.
Figure 6:
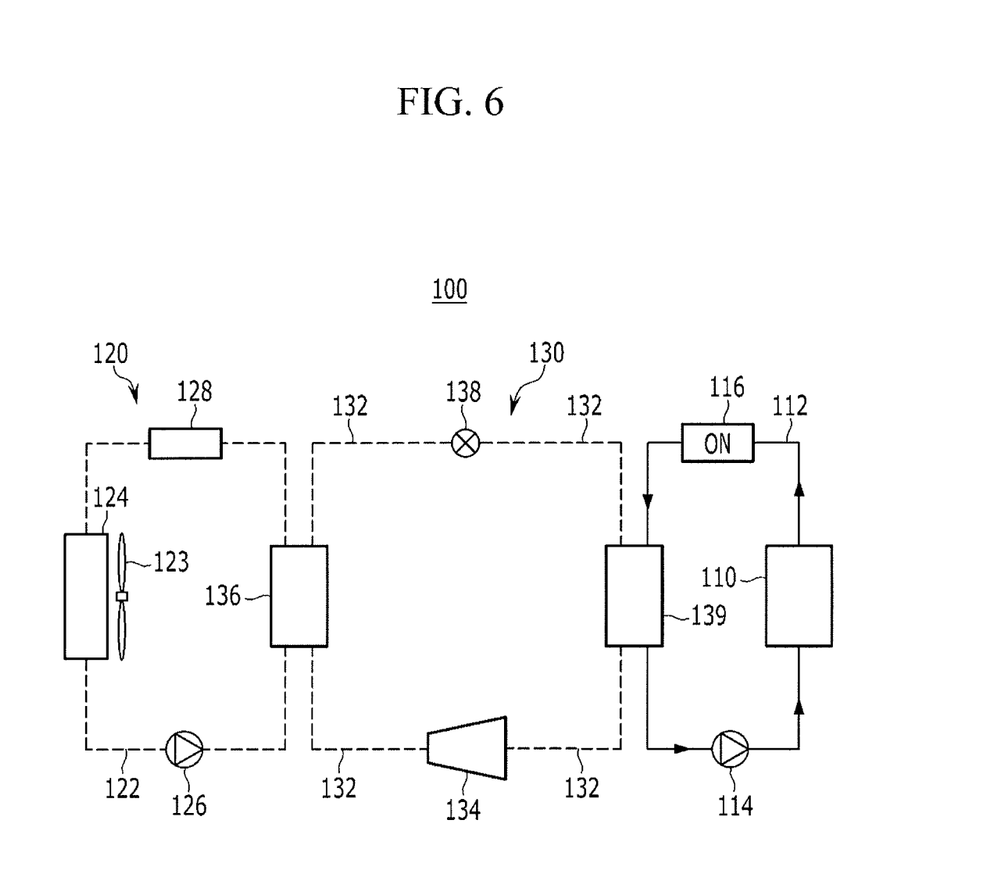
FIG. 6 is a diagram of an operation state of heating the battery in the thermal management system according to the various exemplary embodiments of the present invention.

FIG. 5 is a diagram of an operation state of cooling of the battery in the thermal management system according to the various exemplary embodiments of the present invention, and FIG. 6 is a diagram of an operation state of heating of the battery in the thermal management system according to the various exemplary embodiments of the present invention.

First, operation of the thermal management system with respect to a case that the battery 110 is heated and thus needs to be cooled will be described with reference to FIG. 5.

When the battery 110 needs to be cooled, the refrigerant is discharged from the compressor 134 in a state of high temperature and high pressure and is supplied to the condenser 136 through the refrigerant line 132.

Here, the condenser 136 condenses the refrigerant through thermal exchange with the coolant supplied from the cooling apparatus 120.

The refrigerant condensed by the condenser 136 is expanded while passing through the expansion valve 138 through the refrigerant line 132. The refrigerant which is expanded by the expansion valve 138 is supplied to the evaporator 139 through the refrigerant line 132.

The evaporator 139 evaporates the refrigerant supplied from the expansion valve 138 through thermal exchange with the coolant having flowed therein through the battery coolant line 112, and supplies low-temperature thermal energy generated from evaporation of the refrigerant to decrease a temperature of the coolant.

The low-temperature coolant may be effectively supplied to the battery 110 that needs to be cooled while circulating along the battery coolant line 112 by operation of the first water pump 114.

As described, the evaporator 139 performs thermal exchange between the low-temperature refrigerant and the coolant, and supplies the cooled coolant of which a temperature is decreased to the battery 110 that needs to be cooled such that the battery 110 may be effectively cooled.

An operation for a case for heating the battery 110 in a low-temperature state will be described with reference to FIG. 6.

When the battery 110 needs to be heated, the operations of the second water pump 126 and the compressor 134 are stopped, and operations of the cooling apparatus 120 and the CE modulate 130 are halted. Accordingly, circulation of the coolant and the refrigerant in the radiator coolant line 122 and the refrigerant line 132 are stopped.

In such a state, the first water pump 114 and the electric heater 116 start to operate, and the coolant circulates through the battery coolant line 112.

That is, the electric heater 116 heats the coolant that circulates through the battery coolant line 112 such that a temperature of the coolant is increased. The coolant of which the temperature is increased circulates along the battery coolant line 112 by the operation of the first water pump 114 such that the high-temperature coolant may be effectively supplied to the battery 110 that needs to be heated.

As described, the electric heater 116 can effectively heat the battery 10 that needs to be heated by supplying the coolant of which the temperature is increased without operating the cooling apparatus 120 and the CE module 130.

Accordingly, the thermal management system 100 for batteries according to the various exemplary embodiments of the present invention can effectively manage batteries while simplifying the entire system by performing selective thermal exchange between thermal energy generated from a refrigerant circulating in the system 100 during condensation and evaporation of the refrigerant with a coolant, and effectively heating or cooling the battery 110 by use of the coolant having a low temperature or a high temperature by the thermal exchange.

Furthermore, a relatively inexpensive and high-performing R152-a, R744, or R290 refrigerant is applied to the CE module 30 such that operation efficiency may be improved.

Furthermore, according to an exemplary embodiment of the present invention, the CE module 130 having a modular structure is applied such that manufacturing cost may be saved, weight may be reduced, and special utilization may be improved.

Furthermore, according to an exemplary embodiment of the present invention, since the temperature of the battery 110 may be managed by water cooling and the CE module 130 is used, the system may be applied without regard to capacity of a middle-sized or large-sized battery, and when the system is applied to a vehicle, it is possible to separate the system from an interior heating/cooling apparatus, increasing the degree of freedom of capacity.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermal management system for a battery, the system comprising:
    the battery connected to a battery coolant line, wherein a coolant circulates through the battery coolant line;
    a cooling apparatus including a radiator coolant line and circulating a coolant cooled in a radiator through the radiator coolant line connected to the radiator; and
    a centralized energy (CE) module which is connected to the battery through the battery coolant line, connected to the cooling apparatus through the radiator coolant line, is configured to perform thermal exchange between thermal energy generated from condensation and evaporation of a refrigerant circulating in the CE module and the coolant, and to selectively supply a high-temperature coolant or a low-temperature coolant that has been thermally exchanged to the battery.

2. The thermal management system for the battery of claim 1, Wherein the CE module includes:
    a compressor that is configured to compress a refrigerant;
    a valve connected to the compressor through a first refrigerant line and a fifth refrigerant line;
    a first heat exchanger which is connected to the radiator coolant line, connected to the valve through a second refrigerant line, and condenses or evaporates the refrigerant through thermal exchange with the coolant;
    a second heat exchanger which is connected to the battery coolant line, connected to the first heat exchanger through a third refrigerant line connecting the first heat exchanger and the second heat exchanger, connected to the valve through a fourth refrigerant line connected to the second heat exchanger, and condenses or evaporates the refrigerant through thermal exchange with the coolant; and
    an expansion valve which is provided in the third refrigerant line between the first heat exchanger and the second heat exchanger, and is configured to expand a refrigerant that passes through the third refrigerant line.

3. The thermal management system for the battery of claim 2, wherein the valve connects the first refrigerant line and the second refrigerant line to supply a refrigerant discharged from the compressor to the first heat exchanger when the battery needs to be cooled, and connects the fourth refrigerant line and the fifth refrigerant line to supply the refrigerant to the compressor from the second heat exchanger into which the refrigerant expanded by the expansion valve flows.

4. The thermal management system for the battery of claim 3, wherein the first heat exchanger receives a high-temperature high-pressure refrigerant discharged from the compressor through the first refrigerant line and the second refrigerant line, and is configured as a condenser that condenses a coolant supplied from the cooling apparatus and the refrigerant through thermal exchange.

5. The thermal management system for the battery of claim 3, wherein the second heat exchanger receives a low-temperature low-pressure refrigerant expanded by the expansion valve, and is configured as an evaporator that evaporates a coolant supplied through the battery coolant line and the refrigerant through thermal exchange.

6. The thermal management system for the battery of claim 2, wherein the valve connects the first refrigerant line and the fourth refrigerant line to supply the refrigerant discharged from the compressor to the second heat exchanger when the battery needs to be heated, and connects the second refrigerant line and the fifth refrigerant line to supply the refrigerant to the compressor from the first heat exchanger that receives the refrigerant expanded by the expansion valve.

7. The thermal management system for the battery of claim 6, wherein the first heat exchanger receives a low-temperature low-pressure refrigerant expanded by the expansion valve through the third refrigerant line, and is configured as an evaporator that evaporates the coolant supplied from the cooling apparatus through thermal exchange with the refrigerant.

8. The thermal management system for the battery of claim 6, wherein the second heat exchanger receives a high-temperature and high-pressure refrigerant discharged from the compressor through the first refrigerant line and the fourth refrigerant line, and is configured as a condenser that condenses the refrigerant through thermal exchange with the coolant supplied through the battery coolant line.

9. The thermal management system for the battery of claim 2, wherein the valve is provided as a four-way valve which is respectively connected to the first refrigerant line, the second refrigerant line, the fourth refrigerant line, and the fifth refrigerant line, and selectively connects two of the first, second, fourth, and fifth refrigerant lines.

10. The thermal management system for the battery of claim 1, wherein a first water pump that supplies a coolant to the battery is provided in the battery coolant line.

11. The thermal management system for the battery of claim 1, wherein the cooling apparatus further includes a second water pump which is provided in the radiator coolant line and circulates a coolant cooled in the radiator.

12. The thermal management system for the battery of claim 1, wherein a refrigerant circulating in the CE module is a R152-a, R744, or R290 refrigerant.

13. The thermal management system for the battery of claim 1, wherein the CE module includes:
   a compressor that is configured to compress a refrigerant;
   a condenser which is connected to the compressor through a refrigerant line, connected to the cooling apparatus through the radiator coolant line, and condenses the refrigerant supplied from the compressor by thermal exchange with a coolant supplied through the radiator coolant line;
   an expansion valve Which is connected to the condenser through the refrigerant line and expands the refrigerant; and
   an evaporator which is connected to the expansion valve through the refrigerant line, connected to the battery coolant line, and evaporates the refrigerant expanded by the expansion valve by thermal exchange with a coolant supplied through the battery coolant line.

14. The thermal management system for the battery of claim 13, wherein an electric heater is provided in the battery coolant line between the battery and the evaporator.

15. The thermal management system for the battery of claim 14, wherein, when the battery needs to be heated, operations of the cooling apparatus and the CE module are stopped, the electric heater starts to operate to increase a temperature of a coolant circulating in the battery coolant line, and a temperature-increased coolant is supplied to the battery.

16. The thermal management system the battery of claim 1, wherein a heating body is provided on the radiator coolant line.

* * * * *